(12) United States Patent
Park et al.

(10) Patent No.: US 9,933,862 B2
(45) Date of Patent: Apr. 3, 2018

(54) METHOD FOR SENSING PROXIMITY BY ELECTRONIC DEVICE AND ELECTRONIC DEVICE THEREFOR

(71) Applicant: Samsung Electronics Co., Ltd., Suwon-si, Gyeonggi-do (KR)

(72) Inventors: Eun-Soo Park, Gumi-si (KR); Sun-Ho Kim, Daegu (KR); Jung-Ho Kim, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/829,081

(22) Filed: Aug. 18, 2015

(65) Prior Publication Data

US 2016/0057346 A1 Feb. 25, 2016

(30) Foreign Application Priority Data

Aug. 25, 2014 (KR) ........................ 10-2014-0110750

(51) Int. Cl.
| | | |
|---|---|---|
| *H04N 5/232* | (2006.01) | |
| *G06F 3/03* | (2006.01) | |
| *G06F 1/32* | (2006.01) | |
| *G06F 3/00* | (2006.01) | |
| *H04N 1/00* | (2006.01) | |

(52) U.S. Cl.
CPC .......... *G06F 3/0304* (2013.01); *G06F 1/3231* (2013.01); *G06F 3/005* (2013.01); *H04N 1/00* (2013.01); *H04N 5/232* (2013.01); *H04N 5/23212* (2013.01); *H04N 5/23216* (2013.01); *H04N 5/23241* (2013.01); *H04N 5/23293* (2013.01); *Y02B 60/1289* (2013.01)

(58) Field of Classification Search
CPC .............. H04N 5/232; H04N 5/23212; H04N 5/23216; H04N 5/23293; H04N 5/23241
See application file for complete search history.

(56) References Cited

U.S. PATENT DOCUMENTS

| | | | |
|---|---|---|---|
| 8,748,790 B2 | 6/2014 | Utsunomiya et al. | |
| 2006/0232700 A1* | 10/2006 | Ito ............................ | G02B 7/38 348/345 |
| 2008/0052945 A1* | 3/2008 | Matas ..................... | G06F 3/0485 34/173 |
| 2009/0315869 A1* | 12/2009 | Sugihara ............... | G06F 1/1605 345/204 |
| 2010/0110178 A1* | 5/2010 | Isobe ....................... | G02B 7/36 348/135 |
| 2012/0147150 A1* | 6/2012 | Kojima .................. | G01C 3/085 348/50 |
| 2012/0306770 A1* | 12/2012 | Moore ..................... | G06F 3/01 345/173 |

(Continued)

FOREIGN PATENT DOCUMENTS

KR    10-2011-0107764 A    10/2011

*Primary Examiner* — Abdelaaziz Tissire
(74) *Attorney, Agent, or Firm* — Jefferson IP Law, LLP

(57) ABSTRACT

A method for sensing proximity by an electronic device is provided. The method includes confirming a phase difference regarding a corresponding subject of an image acquired through a lens of the electronic device by operating a phase-difference autofocus sensor and determining that the corresponding subject is proximate to the electronic device when the confirmed phase difference is larger than a designated first reference value.

10 Claims, 5 Drawing Sheets

(56) References Cited

U.S. PATENT DOCUMENTS

| | | | |
|---|---|---|---|
| 2013/0033485 A1* | 2/2013 | Kollin | G06F 1/1637 345/419 |
| 2015/0242982 A1* | 8/2015 | Choi | H04N 5/23293 382/106 |
| 2017/0134623 A1* | 5/2017 | Lee | H04N 5/247 |

* cited by examiner

METHOD FOR SENSING PROXIMITY BY ELECTRONIC DEVICE AND ELECTRONIC DEVICE THEREFOR

CROSS-REFERENCE TO RELATED APPLICATION(S)

This application claims the benefit under 35 U.S.C. § 119(a) of a Korean patent application filed on Aug. 25, 2014 in the Korean Intellectual Property Office and assigned Serial number 10-2014-0110750, the entire disclosure of which is hereby incorporated by reference.

TECHNICAL FIELD

The present disclosure relates to a method for sensing proximity by an electronic device, which may replace the function of a proximity sensor in an electronic device, and an electronic device therefor.

BACKGROUND

Electronic devices according to the related art, such as mobile phones, smartphones, tablet PCs, and the like, are provided with a camera function, and it has recently become possible to apply phase-difference autofocus technology, which had been used for expert-level cameras, to the various electronic devices described above.

In addition, electronic devices have an embedded proximity sensor and thereby sense objects, such as human bodies, proximate to the electronic devices, i.e. have a proximity sensing function. Furthermore, proximity sensors embedded in electronic devices are optical proximity sensors.

FIG. 6 is a diagram illustrating an optical proximity sensor according to the related art.

Referring to FIG. 6, an optical proximity sensor 610 includes, as illustrated in FIG. 6, a light emitting unit 612 and a light receiving unit 615. The light receiving unit 615 senses the amount of light from the light emitting unit 612, which is reflected at a proximate object, and the distance from the object 630 is thereby determined.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a new proximity sensing method that may replace the function of the proximity sensor in an electronic device of the related art and, accordingly, provide a method for sensing proximity by an electronic device, which has a proximity sensing function even without a proximity sensor mounted thereon, and an electronic device therefor.

Typically, an electronic device is equipped with a proximity sensor to have a proximity sensing function, and holes are accordingly formed on the front surface of the electronic device for the light emitting unit and the light receiving unit of the proximity sensor, respectively, separate from the camera. Such a structure results in problems of the electronic device, such as increase of manufacturing costs, limitation on component mounting space, and complexity in the front design.

Another aspect of the present disclosure is to provide a method for sensing proximity by an electronic device, which removes a proximity sensor used by electronic devices of the related art, thereby reducing manufacturing costs, securing component mounting space, and simplifying the front design, and an electronic device therefor.

In accordance with an aspect of the present disclosure, a method for sensing proximity by an electronic device is provided. The method includes confirming a phase difference regarding a corresponding subject of an image acquired through a lens of the electronic device by operating a phase-difference autofocus sensor and determining that the corresponding subject is proximate to the electronic device when the confirmed phase difference is larger than a designated first reference value.

In accordance with another aspect of the present disclosure, an electronic device is provided. The electronic device includes a lens configured to acquire an image of a subject, a phase-difference autofocus sensor configured to detect a phase difference regarding the subject, and a control unit configured to operate the phase-difference autofocus sensor, to detect a phase difference regarding a corresponding subject of the image acquired through the lens, and to determine that the corresponding subject is proximate when the detected phase difference is larger than a designated first reference value.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
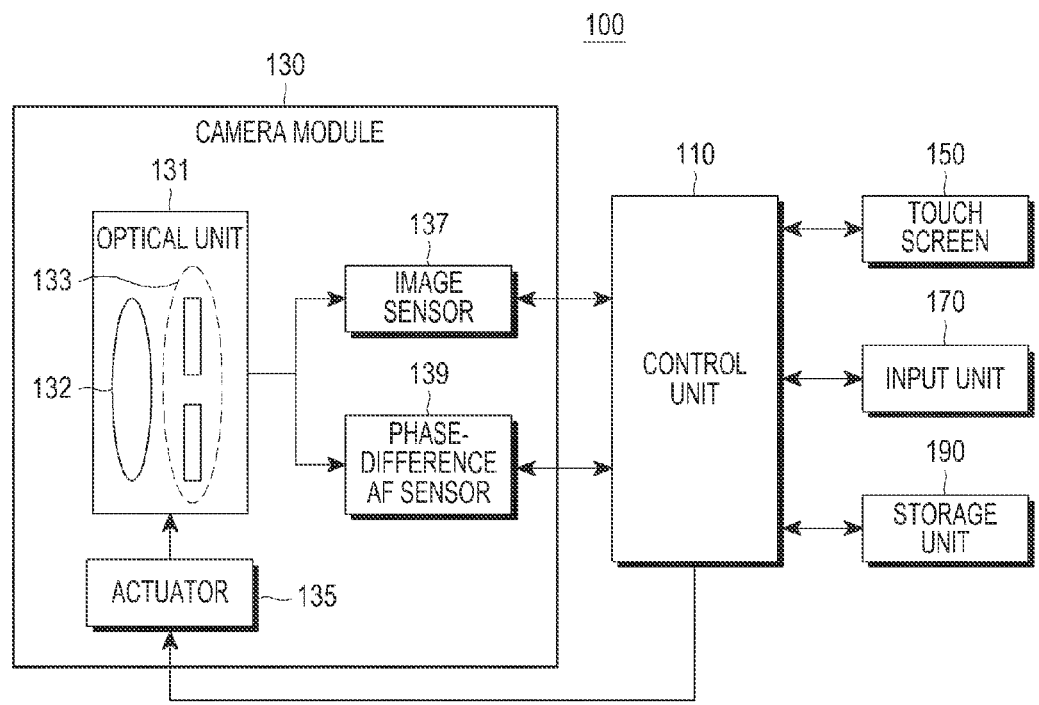
FIG. 1 is a block diagram of an electronic device having a proximity sensing function according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include" or "may include" refers to the existence of a corresponding disclosed function, operation or component which may be used in various embodiments of the present disclosure and does not limit one or more additional functions, operations, or components. Further, as used in embodiment of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B" or "at least A or/and B" may include A, may include B, or may include both A and B.

The expression "1", "2", "first", or "second" used in various embodiments of the present disclosure may modify various components of various embodiments but does not limit the corresponding components. For example, the above expressions do not limit the sequence and/or importance of the corresponding elements. The expressions may be used to distinguish a component element from another component element. For example, a first user device and a second user device indicate different user devices although both of them are user devices. For example, without departing from the scope of the present disclosure, a first component element may be named a second component element. Similarly, the second component element also may be named the first component element.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

In the present disclosure, the terms are used to describe a specific embodiment, and are not intended to limit the present disclosure. As used herein, the singular forms are intended to include the plural forms as well, unless the context clearly indicates otherwise.

Unless defined differently, all terms used herein, which include technical terminologies or scientific terminologies, have the same meaning as a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Electronic devices according to various embodiments of the present disclosure may be devices adopting a communication function. For example, the electronic devices may include at least one of smart phones, tablet personal computers (PCs), mobile phones, video phones, e-book readers, desktop PCs, laptop PCs, netbook computers, personal digital assistants (PDAs), portable multimedia players (PMPs), Moving Picture Experts Group (MPEG-1 or MPEG-2) Audio Layer III (MP3) players, mobile medical devices, cameras, wearable devices (e.g., head-mounted-devices (HMDs) such as electronic glasses), electronic clothes, electronic bracelets, electronic necklaces, electronic appcessories, electronic tattoos, or smart watches.

According to an embodiment, an electronic device may be a smart home appliance with a communication function. The smart home appliance as an example of the electronic device may include at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to an embodiment, an electronic device may include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recorder (EDR), a Flight Data Recorder (FDR), a vehicle infotainment device, an electronic equipment for ship (e.g., a ship navigation device and gyro-compass and the like, avionics, a security device, a head unit for vehicle, an industrial or household robot, an automatic teller machine (ATM) in banking facilities or point of sales (POS) in stores.

According to another embodiment, the electronic devices may include at least one of furniture or a part of a building/structure having a communication function, electronic boards, electronic signature receiving devices, projectors, or various measuring equipment (e.g., equipment for a water supply, an electricity, gases or radio waves). An electronic device according to various embodiments of the present disclosure may be a combination of one or more of above described various devices. Also, an electronic device according to various embodiments of the present disclosure may be a flexible device. Also, an electronic device according to various embodiments of the present disclosure is not limited to the above described devices.

The term "user" used in various embodiments may refer to a person who uses an electronic device or a device (e.g., an artificial intelligence electronic device) that uses an electronic device.

FIG. 1 is a block diagram of an electronic device having a proximity sensing function according to an embodiment of the present disclosure.

Referring to FIG. 1, an electronic device 100 may include a control unit 110, a camera module 130, a touch screen 150, an input unit 170, and a storage unit 190.

The camera module 130 may include an optical unit 131, an actuator 135, an image sensor 137, and a phase-difference Auto Focus (AF) sensor 139. In addition, the camera module 130 may be formed on the front surface of the housing of the electronic device 100. In addition, the camera module 130 may perform a normal digital camera function, such as taking still and moving images of a subject, and may perform a function of acquiring images through the image sensor 137 when the camera module 130 is driven.

The optical unit 131 may include a lens 132 and a shutter 133 and may be driven by the actuator 135 to take images of the periphery, and the lens 132 of the optical unit 131 may be driven by the actuator 135 to perform operations such as zooming and focusing. In addition, the lens 132 may collect light, which is reflected from the subject, into an optical image such that images of the subject may be acquired, and the shutter 133 may adjust the amount of light entering the image sensor 137.

The image sensor 137 may sense an image, which is taken by the optical unit 131, and convert the image into an electric signal. The image sensor 137 may be a Complementary Metal-Oxide-Semiconductor (CMOS) or Charge Coupled Device (CCD) sensor, or a sensor capable of sensing an image of an Ultra High Definition (UHD) or an even higher level.

The phase-difference AF sensor 139 may detect a phase difference regarding a corresponding subject of an image acquired through the lens 132.

The touch screen 150 may include a display panel (not illustrated) that displays output information, which is outputted from the electronic device 100, and an input sensing panel (not illustrated) that performs various user input functions. The display panel may be configured as a Liquid Crystal Display (LCD), Organic Light Emitting Diode (OLED), PMOLED, or AMOLED screen, and may be structurally integrated with the input sensing panel. The display panel may display various operating states of the electronic device 100, menu states, and screen images related to application executions and services.

Meanwhile, the input sensing panel may be implemented as at least one panel capable of sensing various inputs by the user, such as single or multi touch inputs, drag inputs, writing inputs, and drawing inputs, using various objects such as a finger and an electronic pen. For example, the input sensing panel may be implemented using a single panel capable of both finger input sensing and electronic pen input sensing, or using two panels such as a hand sensing panel (not illustrated) capable of finger input sensing and a pen sensing panel (not illustrated) capable of electronic pen input sensing.

The hand sensing panel may sense the user's touch input. The hand sensing panel may have, for example, the shape of a touch film, a touch sheet, or a touch pad. The hand sensing panel senses a touch input and outputs a touch event value corresponding to the sensed touch signal. In this case, information corresponding to the sensed touch signal may be displayed on the display panel. The hand sensing panel may receive a manipulation signal resulting from the user's touch input by means of various input means. For example, the hand sensing panel may sense a touch input made by the user's body (e.g., finger), a physical tool, and the like. Specifically, the hand sensing panel may be configured as a capacitive touch panel. When configured as a capacitive touch panel, the hand sensing panel is configured by coating both surfaces of glass with a thin metal conductive material (e.g., an Indium Tin Oxide (ITO) film) such that a current flows on the glass surface and by coating the glass with a dielectric substance capable of storing electric charge. When an object touches the surface of the hand sensing panel, a predetermined amount of charge is moved to the contact position by static electricity; the hand sensing panel may then recognize the amount of change of current resulting from movement of the charge, senses the touched position, and tracks the touch event. In this case, the touch event occurring on the hand sensing panel may be mainly generated by a human finger, but may also be generated by another object capable of causing a capacitance change (e.g., a conductive object capable of changing the capacitance).

The pen sensing panel senses a proximity input or a contact input of an electronic pen (e.g., a stylus pen, a digitizer pen), as the electronic pen is operated, and outputs a sensed electronic pen proximity event or electronic pen contact event. The pen sensing panel may be implemented in an Electro-Magnetic Resonance (EMR) type and may sense a touch or proximity input according to a change in intensity of an electromagnetic field resulting from the proximity or touch of the pen. Specifically, the pen sensing panel may include an electromagnetic induction coil sensor (not shown) having a grid structure in which a plurality of loop coils are arranged in a predetermined first direction and a second direction intersecting with the first direction, respectively, and an electronic signal processor (not shown) sequentially providing an AC signal having a predetermined frequency to each of the loop coils of the electromagnetic induction coil sensor. When an electronic pen incorporating a resonance circuit exists near a loop coil of the pen sensing panel, a magnetic field transmitted from the corresponding loop coil generates a current, which is based on mutual electromagnetic induction, in the resonance circuit inside the electronic pen. Based on the current, an induced magnetic field is generated from the coil constituting the resonance circuit within the electronic pen, and the pen sensing panel detects the induced magnetic field from the loop coil, which is in a signal receiving state, and thereby senses the proximity position or touch position of the pen. Using the pen sensing panel, proximity and touch from any object may be sensed, as long as the object may generate a current based on electromagnetic induction. Such a pen sensing panel may have an active state when a specific event occurs or by default. In addition, the pen sensing panel may be provided on the lower portion of the display panel with a predetermined area (e.g., an area large enough to cover the display region of the display panel).

The input unit 170 receives manipulation inputted by the user, and may be configured by the above-mentioned touch screen 150. In addition, the input unit 170 may include at least one button (not illustrated) from among a power/lock button and a menu button, which may be formed on the front surface, side surface, or rear surface of the housing of the electronic device 100, and may also include a microphone (not illustrated).

The storage unit 190 may store a signal or data, which is inputted/outputted in conformity with operation of the camera module 130, the touch screen 150, and the input unit 170 under the control of the control unit 110. The storage unit 190 may store a control program for control of the electronic device 100 or the control unit 110, applications, or contents.

According to an embodiment, the term "storage unit" may include a storage unit (190), a ROM (not illustrated) inside the control unit 110, a RAM (not illustrated), or a memory card (not illustrated) mounted on the electronic device 100 (e.g., SD card, memory stick). The storage unit 190 may include a non-volatile memory, a volatile memory, a Hard Disk Drive (HDD), and a Solid State Drive (SSD).

The control unit 110 may include a CPU (not illustrated), a ROM (not illustrated) storing a control program for controlling the electronic device, and a RAM (not illustrated) used for storing a signal or data inputted from outside the electronic device or used as a memory area for a task executed in the electronic device. The CPU (not illustrated) may include a single core, a dual core, a triple core, or a quad core. The CPU (not illustrated), the ROM (not illustrated), and the RAM (not illustrated) may be connected to one another through an internal bus.

In addition, the control unit 110 may control the camera module 130, the touch screen 150, the input unit 170, and the storage unit 190.

In addition, the control unit 110 may operate the phase-difference AF sensor 139 according to an embodiment of the present disclosure, detect a phase difference regarding a corresponding subject of an image acquired through the lens 132, and determine that the corresponding subject is proximate when the detected phase difference is larger than a designated first reference value. In addition, the control unit 110 may determine that the corresponding subject is spaced away when the detected phase difference is smaller than a designated second reference value. In addition, the control unit 110 may control the lens 132 in order to maintain a reference position, with no movement, during an operation of confirming the phase difference.

According to the above-described operation of the control unit 110, the electronic device 100 may sense whether an object (also referred to as a subject) is proximate to the electronic device 100 or not, without driving all of the camera module 130, the touch screen 150, and the input unit 170, but by solely driving the phase-difference AF sensor 139 of the camera module 130, thereby reducing the amount of current consumed by the electronic device 100. In addition, the electronic device 100 operates with no movement of the lens, i.e. the lens being in the designated position, thereby reducing the amount of calculation of the phase difference resulting from lens movement and the amount of consumed current.

Meanwhile, the first reference value may be a phase difference regarding a designated reference subject at a designated first distance value sensed by the phase-difference AF sensor 139, and the second reference value may be a phase difference regarding the designated reference subject at a designated second distance value sensed by the phase-difference AF sensor 139.

Figure 2:
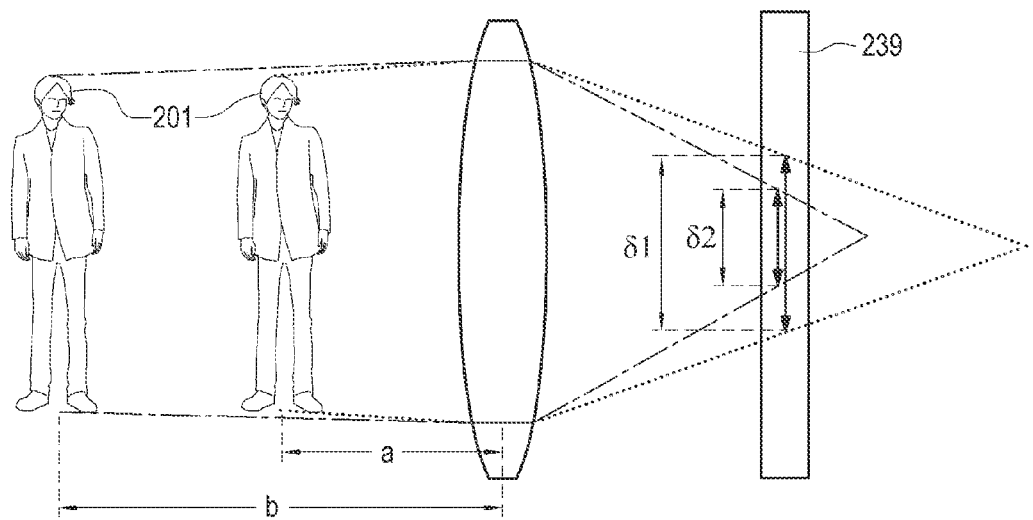
FIG. 2 is a diagram illustrating a principle of redefining data regarding a distance from an object, sensed by a proximity sensor, into phase-difference data sensed by a phase-difference autofocus sensor according to an embodiment of the present disclosure.

FIG. 2 is a diagram illustrating a principle of redefining data regarding a distance from an object, sensed by a proximity sensor, into phase-difference data sensed by a phase-difference autofocus sensor according to an embodiment of the present disclosure.

Referring to FIG. 2, the first and second reference values may be obtained by redefining data regarding distances a and b from an object 201 (may be a human) sensed by a proximity sensor (not illustrated) into data regarding phase differences $\delta 1$ and $\delta 2$ sensed by the phase-difference AF sensor 239. For example, in the case of distance a from the object 201 recognized by the proximity sensor, the phase-difference AF sensor 239 may be operated so that a phase difference $\delta 1$, which is been detected by the phase-difference AF sensor 239 in connection with the object 201, is determined as the first reference value. The recognized distance a may be a distance designated so that, when the proximity sensor mounted on the electronic device has recognized an object positioned within the recognized distance a, the touch screen of the electronic device is turned off. In addition, in the case of release distance b regarding the object 201 sensed by the proximity sensor, the phase-difference AF sensor 239 may be operated so that a phase difference $\delta 2$, which is detected by the phase-difference AF sensor 239 in connection with the object 201, is determined as a second reference value. The release distance b may be a distance designated so that, when the proximity sensor mounted on the electronic device has recognized an object positioned out of the release distance b, the touch screen of the electronic device is turned on.

Figure 3:
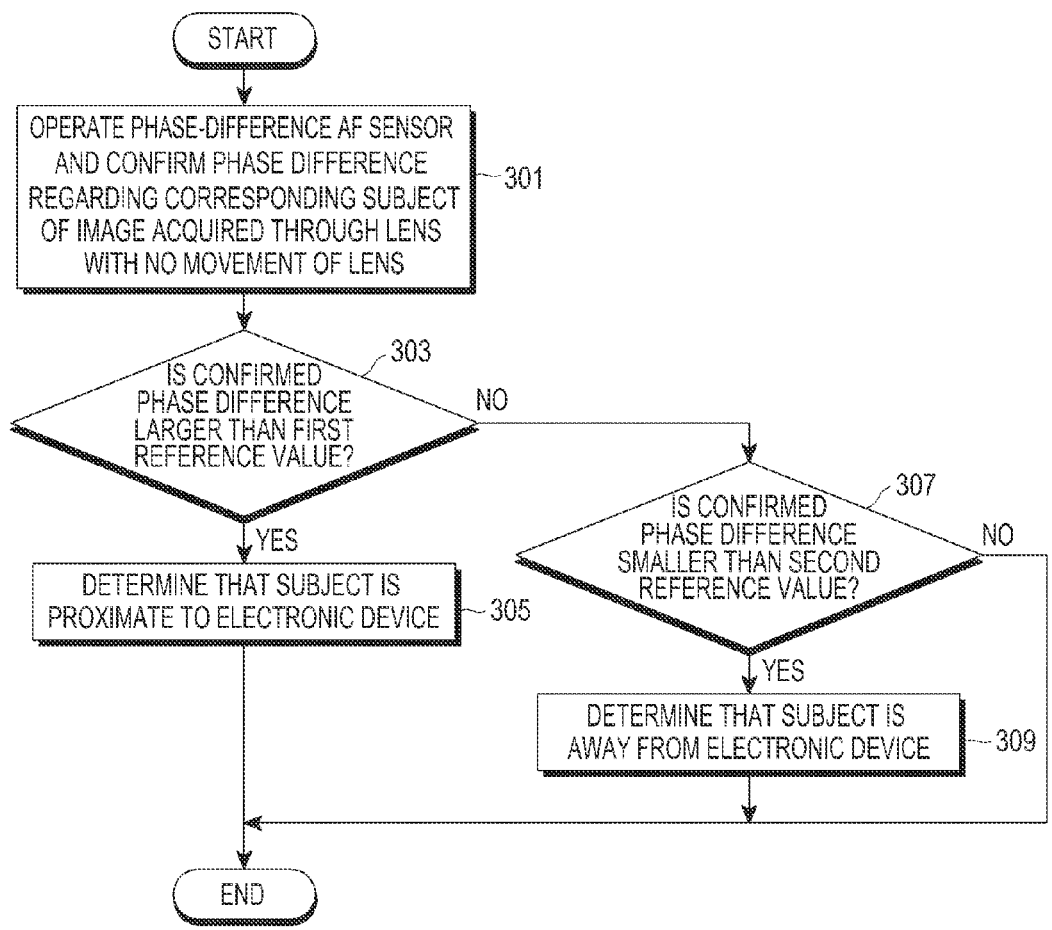
FIG. 3 is a flowchart of proximity sensing operations by an electronic device according to an embodiment of the present disclosure.

FIG. 3 is a flowchart of proximity sensing operations by an electronic device according to an embodiment of the present disclosure.

Referring to FIG. 3, the electronic device may operate the phase-difference AF sensor according to a designated condition (e.g., a specific operation mode, a designated period, and the like) and thereby confirm phase difference information (also referred to as a phase difference) regarding a specific object (also referred to as a subject); the electronic device may compare the confirmed phase difference information with a designated reference value (i.e., the first reference value and the second reference value) and thereby determine whether an object is proximate to the electronic device or not.

In operation 301, the electronic device may operate the phase-difference AF sensor and thereby confirm a phase difference regarding the corresponding subject of the image, which is acquired through the lens, with no movement of the lens. For example, the lens may move to a designated reference position when the camera of the electronic device is turned on; and, when the phase-difference AF sensor is operated to confirm a phase difference regarding a specific subject, the phase-difference AF sensor may acquire phase difference information while maintaining the reference position, with no movement of the lens.

In operation 303, the electronic device may determine whether the confirmed phase difference is larger than a first reference value. When it is determined in operation 303 that the confirmed phase difference is larger than the first reference value, the electronic device may perform operation 305; and, when it is determined in operation 303 that the confirmed phase difference is not larger than the first reference value, the electronic device may perform operation 307.

In operation 305, the electronic device may determine that the subject is proximate to the electronic device.

In operation 307, the electronic device may determine whether the confirmed phase difference is smaller than a second reference value. When it is determined in operation 307 that the confirmed phase difference is smaller than the second reference value, the electronic device may perform operation 309; and, when it is determined in operation 307 that the confirmed phase difference is not smaller than the second reference value, the electronic device may end the operations according to the present disclosure.

In operation 309, the electronic device may determine that the subject is spaced away from the electronic device.

According to whether a subject is proximate to the electronic device or not, based on the above-mentioned operations, the electronic device may be made to perform a specific operation. For example, the electronic device may turn off the touch screen when it is determined that the subject is proximate to the electronic device; and the electronic device may turn on the touch screen when it is determined that the subject is spaced away from the electronic device.

Figure 4:
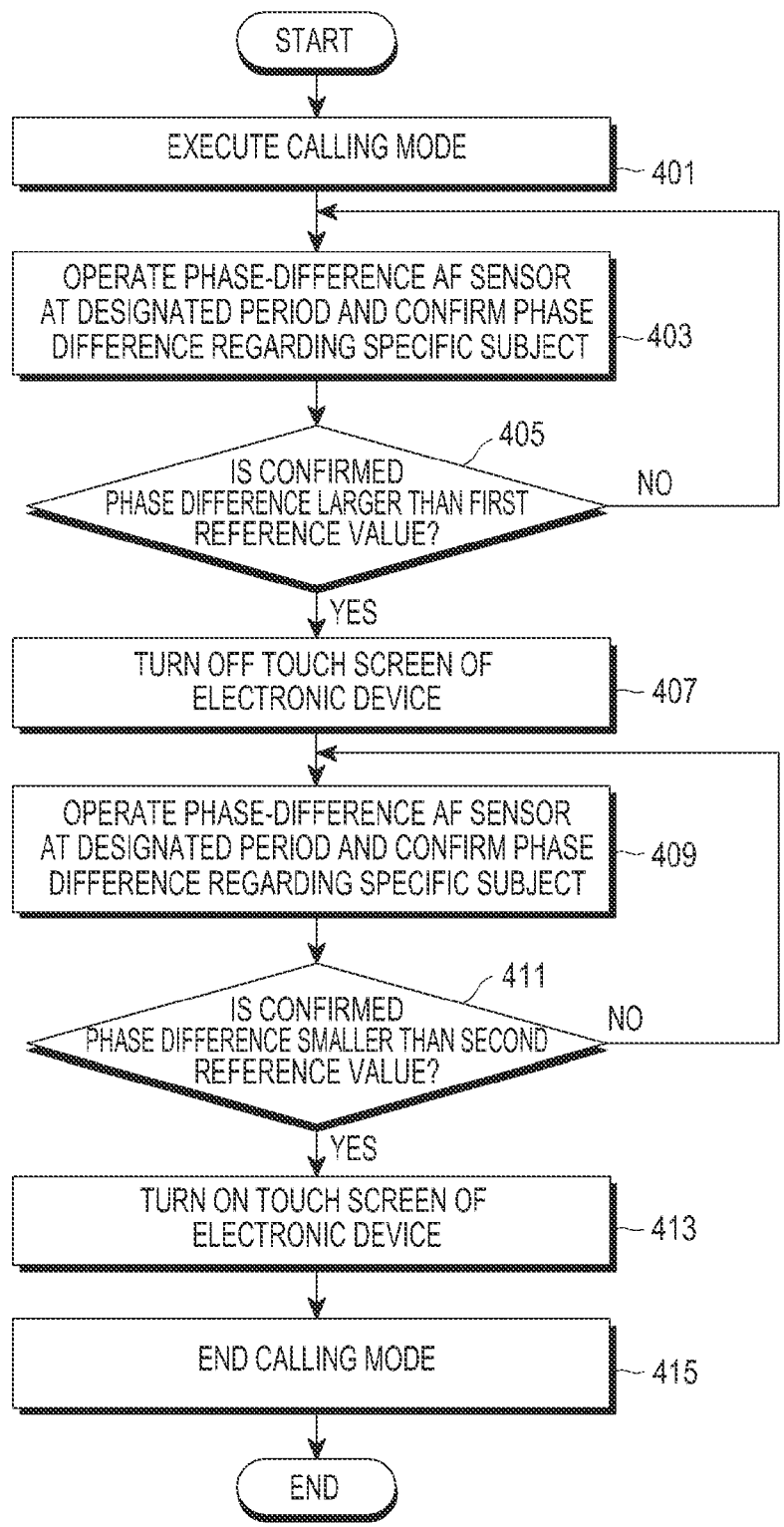
FIG. 4 is a flowchart of proximity sensing operations by an electronic device according to another embodiment of the present disclosure.

FIG. 4 is a flowchart of proximate sensing operations by an electronic device according to another embodiment of the present disclosure.

Referring to FIG. 4, the electronic device may operate the phase-difference AF sensor at a predetermined period in a calling mode and determine, from the phase-difference AF sensor, whether the face (also referred to as a subject) of the user, who uses the electronic device, is proximate to the touch screen of the electronic device or the face of the user is spaced away from the touch screen of the electronic device. In addition, according to the above-mentioned determination, the electronic device may automatically turn off (deactivate) the touch screen, when the user's face is proximate to the touch screen of the electronic device, lest a button displayed on the touch screen should be touched unintentionally and thus execute a function corresponding to the button. In addition, the electronic device may turn on (activate) the touch screen automatically, when the user's face is spaced away from the touch screen of the electronic device, so that, when a user manipulation is inputted on the touch screen, an operation corresponding to the user operation may be executed.

In operation 401, the electronic device may execute a calling mode according to the user's manipulation, such as voice input, touch input, button pressing, and the like.

In operation 403, the electronic device may operate the phase-difference AF sensor at a designated period and thereby confirm a phase difference regarding a specific subject (corresponding subject of an image acquired through the lens). For example, when a specific subject is proximate to the electronic device while the phase-difference AF sensor operates at the designated period, the phase-difference AF sensor may confirm the phase difference of the specific subject.

In operation 405, the electronic device may determine whether the confirmed phase difference is larger than a first reference value or not. When it is determined in operation 405 that the confirmed phase difference is larger than the first reference value, the electronic device may an execute operation 403 again; and, when it is determined in operation 405 that the confirmed phase difference is not larger than the first reference value, the electronic device may execute operation 407.

In operation 407, the electronic device may turn off the touch screen of the electronic device.

For example, when the confirmed phase difference is larger than the first reference value, it may be determined that the specific subject (e.g., the user's face) is proximate to the electronic device, and the touch screen of the electronic device may be turned off accordingly.

In operation 409, the electronic device may operate the phase-difference AF sensor at a designated period and thereby confirm the phase difference regarding a specific subject.

In operation 411, the electronic device may determine whether the confirmed phase difference is smaller than a second reference value or not. When it is determined in operation 411 that the confirmed phase difference is smaller than the second reference value, the electronic device may execute operation 413; and, when it is determined in operation 411 that the confirmed phase difference is not smaller than the second reference value, the electronic device may execute operation 409 again.

In operation 413, the electronic device may turn on the touch screen of the electronic device.

For example, when the confirmed phase difference is smaller than the first reference value, it may be determined that the user's face is spaced away from the electronic device, and the touch screen of the electronic device may be turned on accordingly.

In operation 415, the electronic device may end the calling mode. For example, the electronic device may end the calling mode according to the user's manipulation to end the calling mode. For example, furthermore, when a designated time elapses after determining that the user's face is spaced away from the electronic device, the electronic device may determine that the user's telephone call has ended and automatically end the calling mode.

Figure 5:
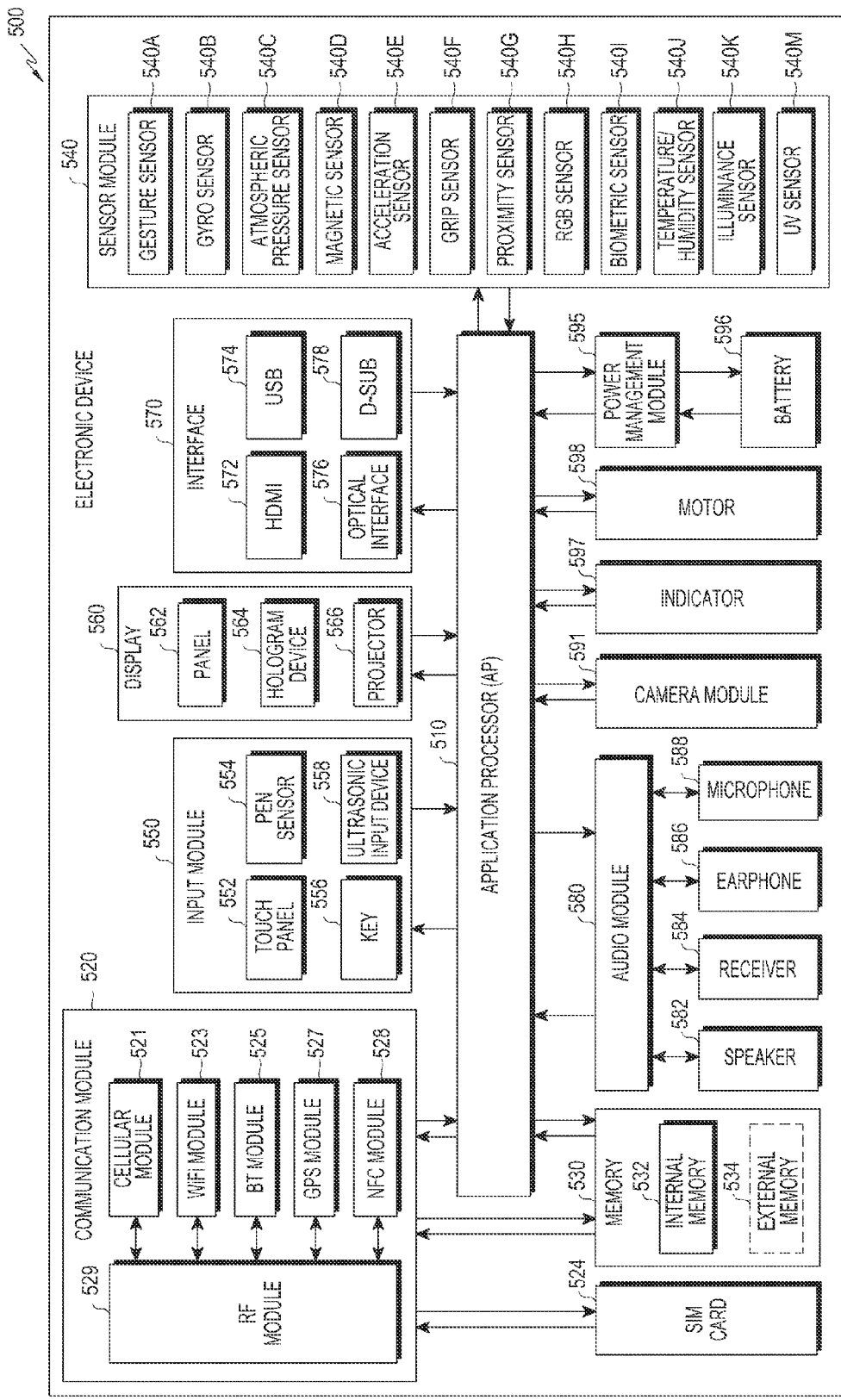
FIG. 5 is a block diagram of an electronic device according to various embodiments of the present disclosure.
Figure 6:
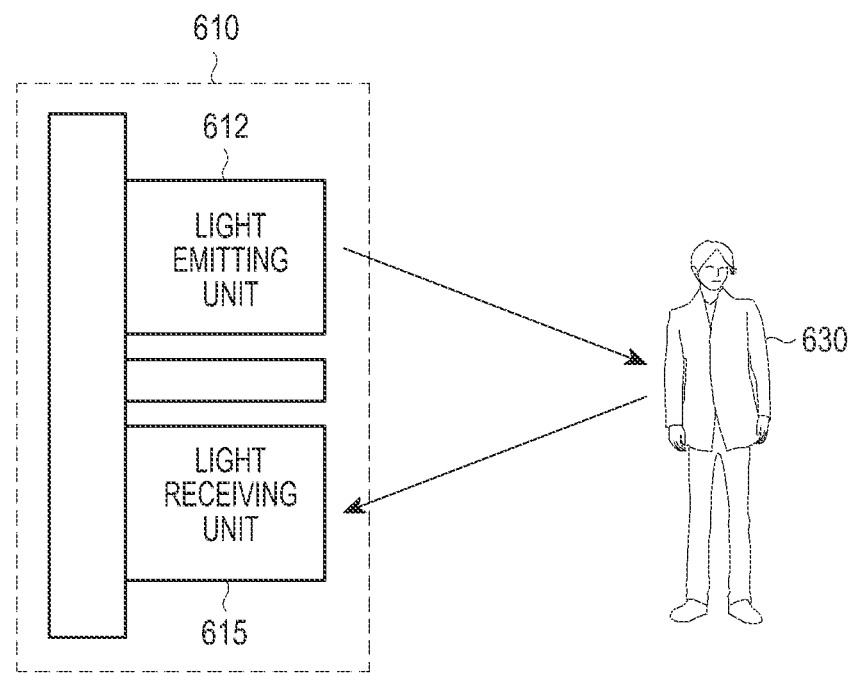
FIG. 6 is a diagram illustrating an optical proximity sensor according to the related art.

FIG. 5 is a block diagram of an electronic device according to various embodiments of the present disclosure. The electronic device (e.g., electronic device 100) may constitute all or part of the electronic device illustrated in FIG. 5, for example.

Referring to FIG. 5, an electronic device 500 may include at least one application processor (AP) 510, a communication module 520, a Subscriber Identification Module (SIM) card 524, a memory 530, a sensor module 540, an input device 550, a display 560, an interface 570, an audio module 580, a camera module 591, a power management module 595, a battery 596, an indicator 597, and a motor 598.

The AP 510 may control a plurality of hardware or software components connected to the AP 510 by driving an operating system or an application program, process various data including multimedia data, and perform calculations. The AP 510 may be embodied as, for example, a System on Chip (SoC). According to an embodiment, the AP 510 may further include a Graphic Processing Unit (GPU).

The communication module 520 (e.g., the communication interface 560) may transmit and receive data during communication between the electronic device 500 and other electronic devices (e.g., another electronic device (not illustrated), a server (not illustrated), or a social search engine (not illustrated)) connected over a network. According to one embodiment, the communication module 520 may include a cellular module 521, a Wi-Fi module 523, a BT module 525, a GPS module 527, an NFC module 528, and a Radio Frequency (RF) module 529.

The cellular module 521 may provide a voice call, a video call, a Short Message Service (SMS), or an Internet service through a communication network (e.g., LTE, LTE-A, CDMA, WCDMA, UMTS, WiBro, GSM or the like). Further, the cellular module 521 may distinguish and authenticate electronic devices within a communication network using a subscriber identification module (e.g., the SIM card 524). According to an embodiment, the cellular module 521 may perform at least some of the functions, which may be provided by the AP 510. For example, the cellular module 521 may perform at least a part of a multimedia control function.

According to an embodiment, the cellular module 521 may include a Communication Processor (CP). Further, the cellular module 521 may be implemented by, for example, an SoC. Although the cellular module 521 (e.g., the CP), the memory 530, and the power management module 595 are illustrated as components separated from the AP 510 in FIG.

5, the AP 510 may be embodied to include at least a part of the above described components (e.g., the cellular module 521) according to an embodiment.

According to an embodiment, the AP 510 or the cellular module 521 (e.g., a CP) may load, to a volatile memory, a command or data received from at least one of a non-volatile memory and other components connected to each of them, and process the loaded command or data. Further, the AP 510 or the cellular module 521 may store data received from or generated by at least one of the other components in a non-volatile memory.

Each of the Wi-Fi module 523, the BT module 525, the GPS module 527, and the NFC module 528 may include, for example, a processor for processing data transmitted/received through the corresponding module. In FIG. 5, the cellular module 521, the WiFi module 523, the BT module 525, the GPS module 527, and the NFC module 528 are illustrated as blocks separated from one another, but at least a part (e.g., two or more) of the cellular module 521, the WiFi module 523, the BT module 525, the GPS module 527, and the NFC module 528 may be included in one Integrated Chip (IC) or one IC package according to an embodiment. For example, at least a part (e.g., a CP corresponding to the cellular module 521 and a Wi-Fi processor corresponding to the Wi-Fi module 523) of processors corresponding to the cellular module 521, the Wi-Fi module 523, the BT module 525, the GPS module 527, and the NFC module 528, respectively, may be embodied as a single SoC.

The RF module 529 may transmit/receive data, for example, an RF signal. Although not illustrated, the RF module 529 may include, for example, a transceiver, a Power Amp Module (PAM), a frequency filter, a Low Noise Amplifier (LNA), or the like. Further, the RF unit 529 may further include a component for transmitting/receiving an electromagnetic wave in the air in a radio communication, such as a conductor or a conducting wire. Although the cellular module 521, the Wi-Fi module 523, the BT module 525, the GPS module 527, and the NFC module 528 are illustrated to share one RF module 529 in FIG. 5, at least one of the cellular module 521, the Wi-Fi module 523, the BT module 525, the GPS module 527, and the NFC module 528 may transmit/receive the RF signal through a separate RF module according to an embodiment.

The SIM card 524 may be a card including a subscriber identification module, and may be inserted into a slot formed in a particular position of the electronic device. The SIM card 524 may include unique identification information (e.g., an Integrated Circuit Card Identifier (ICCID)) or subscriber information (e.g., an International Mobile Subscriber Identity (IMSI)).

The memory 530 may include an internal memory 532 or an external memory 534. The internal memory 532 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment, the internal memory 532 may be a Solid State Drive (SSD). The external memory 534 may further include a flash drive, for example, a Compact Flash (CF), a Secure Digital (SD), a Micro Secure Digital (Micro-SD), a Mini Secure Digital (Mini-SD), an extreme Digital (xD), a memory stick or the like. The external memory 534 may be functionally connected to the electronic device 500 through various interfaces. According to an embodiment, the electronic device 500 may further include a storage device (or storage medium) such as a hard drive.

The sensor module 540 may measure a physical quantity or sense an operation state of the electronic device 500, and may convert the measured or sensed information to an electronic signal. The sensor module 540 may include at least one of, for example, a gesture sensor 540A, a gyro sensor 540B, an atmospheric pressure sensor 540C, a magnetic sensor 540D, an acceleration sensor 540E, a grip sensor 540F, a proximity sensor 540G, a color sensor 540H (e.g., a Red/Green/Blue (RGB) sensor), a biometric sensor 540I, a temperature/humidity sensor 540J, an illumination sensor 540K, and an Ultra Violet (UV) sensor 540M. Additionally or alternatively, the sensor module 540 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 540 may further include a control circuit for controlling one or more sensors included therein.

The input device 550 may include a touch panel 552, a (digital) pen sensor 554, a key 556, and/or an ultrasonic input device 558. The touch panel 552 may recognize a touch input through at least one of, for example, a capacitive scheme, a resistive scheme, an infrared scheme, and an ultrasonic scheme. The touch panel 552 may further include a control circuit. The capacitive scheme touch panel may recognize physical contact or proximity. The touch panel 552 may further include a tactile layer. In this case, the touch panel 552 may provide a tactile reaction to a user.

The (digital) pen sensor 554 may be embodied, for example, using a method identical or similar to a method of receiving a touch input of a user, or using a separate recognition sheet. The key 556 may include, for example, a physical button, an optical key or a keypad. The ultrasonic input device 558 is a device which may sense an acoustic wave using a microphone (e.g., microphone 588) of the electronic device 500 through an input tool generating an ultrasonic signal, to identify data and may perform wireless recognition. According to an embodiment, the electronic device 500 may receive a user input from an external device (e.g., a computer or a server) connected to the electronic device 500 by using the communication module 520.

The display 560 (e.g., display 560) may include a panel 562, a hologram device 564, or a projector 566. The panel 562 may be, for example, a Liquid Crystal Display (LCD), Active-Matrix Organic Light Emitting Diode (AM-OLED), or the like. The panel 562 may be embodied to be, for example, flexible, transparent, or wearable. The panel 562 may be also configured as one module together with the touch panel 552. The hologram device 564 may show a stereoscopic image in the air by using interference of light. The projector 566 may project light onto a screen to display an image. For example, the screen may be located inside or outside the electronic device 500. According to an embodiment, the display 560 may further include a control circuit for controlling the panel 562, the hologram device 564, or the projector 566.

The interface 570 may include, for example, a High-Definition Multimedia Interface (HDMI) 572, a Universal Serial Bus (USB) 574, an optical interface 576, and/or a D-subminiature (D-sub) 578. Additionally or alternatively, the interface 570 may include, for example, a Mobile High-definition Link (MHL) interface, a Secure Digital (SD) card/Multi-Media Card (MMC) interface, or an Infrared Data Association (IrDA) standard interface.

The audio module 580 may bidirectionally convert a sound and an electronic signal. The audio module 580 may process voice information input or output through, for example, a speaker 582, a receiver 584, earphones 586, the microphone 588 or the like.

The camera module 591 is a device which may photograph a still image and a video. According to an embodiment, the camera module 591 may include one or more image sensors (e.g., a front sensor or a rear sensor), a lens (not illustrated), an Image Signal Processor (ISP) (not illustrated) or a flash (not illustrated) (e.g., an LED or xenon lamp).

The power management module 595 may manage power of the electronic device 500. Although not illustrated, the power management module 595 may include, for example, a Power Management Integrated Circuit (PMIC), a charger Integrated Circuit (IC), or a battery or fuel gauge.

The PMIC may be mounted to, for example, an integrated circuit or an SoC semiconductor. Charging methods may be classified into a wired charging method and a wireless charging method. The charger IC may charge a battery and prevent over voltage or over current from being flowed from a charger. According to an embodiment, the charger IC may include a charger IC for at least one of the wired charging method and the wireless charging method. A magnetic resonance scheme, a magnetic induction scheme, or an electromagnetic scheme may be exemplified as the wireless charging method, and an additional circuit for wireless charging, such as a coil loop circuit, a resonance circuit, a rectifier circuit, and the like may be added.

The battery gauge may measure, for example, the remaining amount of the battery 596, a charging voltage and current, or temperature. The battery 596 may store or generate electricity, and may supply power to the electronic device 500 using the stored or generated electricity. The battery 596 may include, for example, a rechargeable battery or a solar battery.

The indicator 597 may display a particular status of the electronic device 500 or a part thereof (e.g., the AP 510), for example, a booting status, a message status, a charging status, or the like. The motor 598 may convert an electrical signal to a mechanical vibration. Although not illustrated, the electronic device 500 may include a processing unit (e.g., GPU) for mobile TV support. The processing unit for supporting the mobile TV may process media data according to a standard of Digital Multimedia Broadcasting (DMB), Digital Video Broadcasting (DVB), media flow or the like.

The above described components of the electronic device according to various embodiments of the present disclosure may be formed of one or more components, and a name of a corresponding component element may be changed based on the type of electronic device. The electronic device according to the present disclosure may include one or more of the aforementioned components or may further include other additional components, or some of the aforementioned components may be omitted. Further, some of the components of the electronic device according to the various embodiments of the present disclosure may be combined to form a single entity, and thus, may equivalently execute functions of the corresponding elements prior to the combination.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGAs), and a programmable-logic device for performing operations which have been known or are to be developed hereafter.

According to various embodiments, at least part of a device (e.g., modules or functions thereof) or a method (e.g., operations) according to the various embodiments of the present disclosure may be embodied by, for example, an instruction stored in a computer readable storage medium provided in a form of a programming module. When the command is executed by one or more processors, the one or more processors may perform a function corresponding to the command. The computer-readable storage medium may be, for example, the memory. At least some of the programming modules may be implemented (e.g., executed) by, for example, the processor. At least a part of the programming module may include, for example, a module, a program, a routine, a set of instructions and/or a process for performing one or more functions.

The computer-readable recording medium may include magnetic media such as a hard disk, a floppy disk, and a magnetic tape, optical media such as a Compact Disc ROM (CD-ROM) and a Digital Versatile Disc (DVD), magneto-optical media such as a floptical disk, and hardware devices specially configured to store and perform a program instruction (e.g., programming module), such as a ROM, a RAM, a flash memory and the like. In addition, the program instructions may include high class language codes, which may be executed in a computer by using an interpreter, as well as machine codes made by a compiler. The aforementioned hardware device may be configured to operate as one or more software modules in order to perform the operation of various embodiments of the present disclosure, and vice versa.

Various embodiments of the present disclosure provided in the present specifications and drawings are merely certain examples to readily describe the technology associated with various embodiments of the present disclosure and to help understanding of various embodiments of the present disclosure, but may not limit the scope of various embodiments of the present disclosure. Therefore, in addition to the various embodiments disclosed herein, the scope of the various embodiments of the present disclosure should be construed to include all modifications or modified forms drawn based on the technical idea of the various embodiments of the present disclosure.

It will be appreciated that the various embodiments of the present disclosure may be implemented in a form of hardware, software, a combination of hardware and software. Regardless of being erasable or re-recordable, such an optional software may be stored in a non-volatile storage device such as a ROM, a memory such as a RAM, a memory chip, a memory device, or an integrated circuit, or a storage medium such as a CD, a DVD, a magnetic disc, or a magnetic tape that is optically or electromagnetically recordable and readable by a machine, for example, a computer. It is appreciated that the storage unit included in the electronic device is one example of the machine-readable storage media suitable for storing a program or programs including commands for implementing various embodiments of the present disclosure. Accordingly, the present disclosure includes a program that includes a code for implementing an apparatus or a method defined in any claim in the present specification and a machine-readable storage medium that stores such a program. Further, the program may be electronically transferred by a predetermined medium such as a communication signal transferred through a wired or wireless connection, and the present disclosure appropriately includes equivalents of the program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for sensing proximity by an electronic device, the method comprising:
    acquiring a phase difference regarding a corresponding subject of an image acquired through a lens of the electronic device by operating a phase-difference autofocus sensor;
    determining that the corresponding subject is proximate to the electronic device when the confirmed phase difference is larger than a designated first reference value;
    after determining that the corresponding subject is proximate to the electronic device, maintaining the lens in a reference position;
    determining that the corresponding subject is spaced away from the electronic device when the acquired phase difference decreases smaller than a designated second reference value; and
    performing a predetermined operation in response to determining that the corresponding subject is spaced away from the electronic device.

2. The method of claim 1, further comprising:
    turning on the touch screen when it is determined that the corresponding subject is spaced away from the electronic device.

3. The method of claim 2, further comprising:
    executing a calling mode of the electronic device according to user manipulation; and
    operating the phase-difference autofocus sensor at a predetermined period when the calling mode is executed.

4. The method of claim 1,
    wherein the designated first reference value is a phase difference regarding a designated reference subject sensed by the phase-difference autofocus sensor at a designated first distance value, and
    wherein the designated second reference value is a phase difference regarding the reference subject sensed by the phase-difference autofocus sensor at a designated second distance value.

5. The method of claim 1, further comprising operating the phase-difference autofocus sensor at a designated period.

6. An electronic device comprising:
    a touch screen;
    a lens configured to acquire an image of a subject;
    a phase-difference autofocus sensor configured to detect a phase difference regarding the subject; and
    a controller configured to:
        operate the phase-difference autofocus sensor,
        detect a phase difference regarding a corresponding subject of the image acquired through the lens,
        determine that the corresponding subject is proximate to the electronic device when the detected phase difference is larger than a designated first reference value,
        maintain the lens in a reference position after determining that the corresponding subject is proximate to the electronic device,
        determine that the corresponding subject is spaced away from the electronic device when the detected phase difference decreases smaller than a designated second reference value, and
        perform a predetermined operation in response to determining that the corresponding subject is spaced away from the electronic device.

7. The electronic device of claim 6, wherein the controller is further configured to turn on the touch screen when it is determined that the corresponding subject is spaced away.

8. The electronic device of claim 7,
    wherein the electronic device further comprises an input device for receiving inputted user manipulation, and
    wherein the controller is further configured to:
        execute a calling mode according to user manipulation inputted through the input device, and
        operate the phase-difference autofocus sensor at a designated period when the calling mode is executed.

9. The electronic device of claim 7, wherein the touch screen is turned off to prevent the subject from unintentionally pressing a button of the touch-screen.

10. The electronic device of claim 6,
    wherein the designated first reference value is a phase difference regarding a designated reference subject sensed by the phase-difference autofocus sensor at a designated first distance value, and
    wherein the designated second reference value is a phase difference regarding the designated reference subject sensed by the phase-difference autofocus sensor at a designated second distance value.

* * * * *